(12) United States Patent
Talbot (10) Patent No.: US 10,708,419 B1
(45) Date of Patent: Jul. 7, 2020

(54) METHOD AND SYSTEM FOR RATING MULTIPLE CALL DESTINATION TYPES FROM A SINGLE VIDEO RELAY KIOSK IN A CORRECTIONS FACILITY

(71) Applicant: Chris Talbot, Moorpark, CA (US)

(72) Inventor: Chris Talbot, Moorpark, CA (US)

(*) Notice: Subject to any disclaimer, the term of this patent is extended or adjusted under 35 U.S.C. 154(b) by 0 days.

(21) Appl. No.: 16/443,343

(22) Filed: Jun. 17, 2019

(51) Int. Cl.
*H04M 3/42* (2006.01)
*H04M 15/16* (2006.01)
*H04N 7/14* (2006.01)
*H04M 15/00* (2006.01)

(52) U.S. Cl.
CPC ......... *H04M 3/4211* (2013.01); *H04M 15/09* (2013.01); *H04N 7/147* (2013.01); *H04N 7/148* (2013.01)

(58) Field of Classification Search
CPC .... H04M 3/4211; H04M 15/09; H04N 7/147; H04N 7/148
USPC .................... 379/52, 114.01, 201.01, 207.14
See application file for complete search history.

(56) References Cited

U.S. PATENT DOCUMENTS

| | | | | |
|---|---|---|---|---|
| 5,163,081 | A * | 11/1992 | Wycherley | H04M 3/42391 379/265.02 |
| 5,382,972 | A | 1/1995 | Kannes | |
| 5,978,014 | A | 11/1999 | Martin et al. | |
| 6,639,977 | B1 * | 10/2003 | Swope | H04M 15/08 379/114.01 |
| 7,046,779 | B2 | 5/2006 | Hesse | |
| 7,142,642 | B2 | 11/2006 | McClelland et al. | |
| 7,206,386 | B2 | 4/2007 | Clapp et al. | |
| 7,349,955 | B1 | 3/2008 | Korb et al. | |
| 7,573,985 | B2 | 8/2009 | McClelland et al. | |
| 7,746,984 | B2 | 6/2010 | Nola et al. | |
| 7,899,167 | B1 | 3/2011 | Rae | |
| 8,010,706 | B1 | 8/2011 | Rein et al. | |
| 8,204,179 | B2 | 6/2012 | Goldman et al. | |
| 8,345,827 | B2 | 1/2013 | Liebermann et al. | |
| 8,374,325 | B2 | 2/2013 | Robotka | |
| 8,528,068 | B1 | 9/2013 | Weglein et al. | |
| 8,739,234 | B1 | 5/2014 | Cheung et al. | |
| 8,817,966 | B2 | 8/2014 | Wrench | |

(Continued)

OTHER PUBLICATIONS

Federal Communications Commission, Direct Video Calling Fact Sheet, retrieved on Apr. 16, 2019 from https://www.fcc.gov/file/11737/download.

(Continued)

*Primary Examiner* — Harry S Hong
(74) *Attorney, Agent, or Firm* — Scheinberg & Associates, PC; John B. Kelly (57) ABSTRACT

A method and system for rating multiple call destination types from a single video relay kiosk in a corrections facility. The method comprises receiving an indication of a first dialed phone number by a video relay kiosk in a corrections facility, the first dialed phone number representing a destination for a first phone call; querying a remote database or a local database or a third-party service provider to determine a first call destination type associated with the first dialed phone number; recording the first call destination type returned from the query; and recording a first charge for the first phone call, the first charge being based upon a first rate associated with the first call destination type returned from the query.

24 Claims, 9 Drawing Sheets

(56) References Cited

U.S. PATENT DOCUMENTS

| | | | |
|---|---|---|---|
| 9,106,789 B1 | 8/2015 | Shipman et al. | |
| 9,247,200 B2 | 1/2016 | Gupta et al. | |
| 9,330,088 B2 | 5/2016 | Fitterer et al. | |
| 9,344,674 B2 | 5/2016 | Talbot | |
| 9,558,523 B1 | 1/2017 | Hodge | |
| 9,615,060 B1 | 4/2017 | Hodge | |
| 9,628,620 B1 | 4/2017 | Rae et al. | |
| 9,667,763 B1 | 5/2017 | Keiser et al. | |
| 9,794,399 B1 | 10/2017 | Hodge | |
| 10,057,256 B1 | 8/2018 | Talbot | |
| 10,110,731 B2 | 10/2018 | Talbot | |
| 10,122,968 B1* | 11/2018 | Talbot | H04N 7/15 |
| 10,129,505 B2 | 11/2018 | Talbot | |
| 10,547,813 B2* | 1/2020 | Talbot | G10L 15/22 |
| 2003/0069997 A1 | 4/2003 | Bravin et al. | |
| 2005/0086699 A1 | 4/2005 | Hahn et al. | |
| 2005/0094793 A1 | 5/2005 | D'Agosto et al. | |
| 2005/0123111 A1 | 6/2005 | Philbin et al. | |
| 2005/0129185 A1 | 6/2005 | McClelland et al. | |
| 2005/0180552 A1* | 8/2005 | Honda | H04L 12/14 379/114.21 |
| 2005/0226394 A1* | 10/2005 | Engelke | H04M 3/42391 379/52 |
| 2005/0238143 A1 | 10/2005 | Clapp et al. | |
| 2006/0026001 A1 | 2/2006 | Bravin et al. | |
| 2006/0074624 A1 | 4/2006 | Sahashi | |
| 2006/0285652 A1 | 12/2006 | McClelland et al. | |
| 2007/0041545 A1 | 2/2007 | Gainsboro | |
| 2008/0219422 A1 | 9/2008 | Polozola et al. | |
| 2009/0028300 A1 | 1/2009 | McLaughlin | |
| 2009/0174759 A1 | 7/2009 | Yeh et al. | |
| 2009/0262906 A1 | 10/2009 | Goldman et al. | |
| 2010/0027765 A1 | 2/2010 | Schultz et al. | |
| 2010/0066803 A1 | 3/2010 | Robotka | |
| 2011/0170672 A1* | 7/2011 | Engelke | H04M 3/42382 379/52 |
| 2011/0261941 A1 | 10/2011 | Walters et al. | |
| 2012/0176466 A1 | 7/2012 | Wrench | |
| 2012/0196580 A1 | 8/2012 | Simmons et al. | |
| 2012/0224678 A1 | 9/2012 | Walters et al. | |
| 2013/0194377 A1 | 8/2013 | Humphries | |
| 2014/0267540 A1 | 9/2014 | Torgersrud | |
| 2015/0022616 A1 | 1/2015 | Talbot | |
| 2015/0037770 A1 | 2/2015 | Philp et al. | |
| 2015/0271444 A1 | 9/2015 | DeFazio et al. | |
| 2015/0319612 A1 | 11/2015 | Hodge | |
| 2016/0198121 A1 | 7/2016 | Walker et al. | |
| 2016/0212259 A1 | 7/2016 | Higgs | |
| 2017/0017876 A1 | 1/2017 | Modha | |
| 2017/0034479 A1 | 2/2017 | Thelin et al. | |
| 2017/0280100 A1 | 9/2017 | Hodge | |
| 2017/0318143 A1 | 11/2017 | Hodge | |
| 2018/0013886 A1 | 1/2018 | Rae et al. | |
| 2019/0019264 A1* | 1/2019 | Hodge | G06Q 20/405 |

OTHER PUBLICATIONS

Federal Communications Commission; Consumer Guide: Video Relay Services; Last Reviewed Oct. 2, 2017; retrieved on Apr. 16, 2019 from https://www.fcc.gov/sites/default/files/video_relay_services.pdf.

Neustar, Inc.; Neustar Networking Solutions Ensure Seamless Interconnection; Carrier Services: Service Sheet; copyright 2013; 21575 Rigetop Circle, Sterling, VA 20166; retreived on Apr. 30, 2019 from https://ns-cdn.neustar.biz/creative_services/biz/neustar/www/resources/product-literature/csp/ensure-seamless-interconnection.pdf.

* cited by examiner

METHOD AND SYSTEM FOR RATING MULTIPLE CALL DESTINATION TYPES FROM A SINGLE VIDEO RELAY KIOSK IN A CORRECTIONS FACILITY

TECHNICAL FIELD

Embodiments of the present invention relate to telecommunications services for callers who are deaf, hard-of-hearing, or speech impaired (D-HOH-SI).

BACKGROUND

Traditional telephony can be difficult or impossible for persons who are who are deaf, hard of hearing, or speech-impaired (D-HOH-SI). Communication by telephone requires each party to a telephone call to be able to hear and/or speak to the other party on the call with sufficient fidelity to communicate. For hearing or speech impaired persons, audio communication with sufficient fidelity is difficult or impossible, making telephone communication difficult or impossible.

Early approaches to facilitating telecommunications for D-HOH-SI persons included text-based telecommunications relay service (TRS). Text-based TRS services allow a D-HOH-SI person to communicate with other people over an existing telecommunications network using devices capable of transmitting and receiving text characters over the telecommunications network. Such devices include the telecommunications device for the deaf (TDD) and the teletypewriter (TTY). Text-based TRS services were well-suited to the bandwidth limitations of subscriber lines of the time. The bandwidth limitations of subscriber lines were also a limiting factor in the widespread use of video telephony.

The availability of affordable, high-speed packet-switched communications has led to the growth in the use of Video Relay Service (VRS) communication by D-HOH-SI persons. VRS is a form of TRS that enables persons with hearing disabilities who use American Sign Language (ASL) to communicate with voice telephone users through video equipment, rather than through typed text. Video equipment links the VRS user with a TRS operator (called a communications assistant, or "CA") so that the VRS user and the CA can see and communicate with each other in signed conversation. Because the conversation between the VRS user and the CA flows much more quickly than with a text-based TRS call, VRS has become an enormously popular form of TRS.

VRS, like other forms of TRS, allows persons who are deaf, hard-of-hearing, or speech impaired to communicate through the telephone system with hearing persons. The VRS caller, using a television or a computer with a video camera device and a broadband (high speed) Internet connection, contacts a VRS CA, who is a qualified sign language interpreter (SLI). The VRS caller and the VRS CA communicate with each other in sign language through a video link. The VRS CA then places a telephone call to the hearing party the VRS caller wishes to call. The VRS CA relays the conversation back and forth between the parties: in sign language with the VRS caller, and by voice with the hearing party. No typing or text is involved. A voice telephone user can also initiate a VRS call by calling a VRS center, usually through a toll-free number.

The VRS CA can be reached through the VRS provider's Internet site, or through video equipment attached to a television. VRS is different from some of the other forms of TRS in two important ways: the conversation between the VRS caller and the CA is made through a video link and sign language, rather than typed text; and VRS service relies on the Internet, rather than the telephone system, for the connection between the VRS user and the CA.

In the United States, VRS service is regulated by the Federal Communications Commission (FCC). Currently, around ten providers offer VRS service. Like all TRS calls, VRS is free to the subscriber. VRS providers are compensated for their costs from the Interstate TRS Fund, which the Federal Communications Commission (FCC) oversees. VRS providers must meet various requirements established by the FCC. VRS is a relatively new service and, unlike some other forms of TRS, it is not mandatory. However, corrections facilities (such as a prison, penitentiary, juvenile detention center, and the like) are increasingly being required to provide VRS service to their inmates, if not by law or regulation, then by lawsuits.

Video remote interpreting (VRI) is a video-telecommunication service that uses devices such as web cameras or videophones to provide sign language or spoken language interpreting services. This is done through a remote or offsite interpreter in order to communicate with persons with whom there is a communication barrier. VRI is similar to VRS in that a sign language interpreter is used to mediate a conversation between a hearing party and a D-HOH-SI party. VRI differs from VRS in several ways. For example, VRS is a telecommunications service where the parties to the conversation are each located in different places, as the calling parties are with regular person-to-person telephone service. With VRI, the parties to the conversation are usually not geographically remote but are instead in the same room as each other. However, the parties cannot communicate because one party is D-HOH-SI and the other party cannot communicate via sign language.

Another difference between VRI and VRS is that VRI is a contracted service used by organizations to help them communicate with Limited English Proficient or Deaf/Hard of Hearing customers. VRS is principally a service provided to the deaf community, whereby a deaf person can contact the service, and use the interpreter to contact a third-party.

A typical application of VRI service at a corrections institution is in the infirmary, where a D-HOH-SI inmate is in an examination room with a health care provider who does not know sign language. VRI service enables the health care provider to communicate with the D-HOH-SI inmate via a remote SLI. VRI is a type of telecommunications relay service (TRS) that is not regulated by the FCC. VRI providers are not compensated for the costs of providing VRI service through the TRS fund the way VRS providers are compensated for providing VRS service. The corrections institution typically enters into a private contract with a VRI provider to provide VRI service at a particular rate (e.g., $3/minute), and the costs are passed on to the corrections facility.

Video Visitation (VV) is the use of videoconferencing and/or analog CCTV systems and software to allow inmates and visitors to visit at a distance as opposed to face-to-face. VV allows people with a computer, internet, webcam, and credit card to communicate with inmates at corrections facilities that support it. Video visitation is a term used for technology that allows the inmate and visitor to communicate via analog or digital videoconferencing equipment. Under the old method of face-to-face visitation, inmates were transferred from their housing area to the visitation area, while visitors often had to walk through the facility. With video visitation, inmates use a video visitation station located in their cell or cell block, while visitors can use a corresponding station elsewhere in the corrections facility or use computers from their homes or offices. VV reduces the amount of manpower needed to conduct visits by reducing the movement of inmates and reducing inmate movement also reduces contraband at the facility. Some prisons have ended all in-person visitations, leaving video visitations as the only option for communication with inmates.

Video Relay Service (VRS), Video Remote Interpreting (VRI), and Video Visitation (VV) are just a few examples of video-enabled call destination types provided by corrections facilities to their D-HOH-SI inmates. The various call destination types can be billed at different rates depending upon the contract a correction facility has with a particular provider and whether government subsidies are available. What is needed is a way to determine a call destination type based on the number dialed by the inmate. Accurately determining a call destination type based on the number dialed by the inmate enables a corrections facility to accurately charge its inmates for use of the services provided and offset at least some of the cost of installing and maintaining the equipment.

SUMMARY OF THE INVENTION

Embodiments of the present invention are directed to a method and system for rating multiple call destination types from a single video relay kiosk in a corrections facility. In one embodiment, the method comprises receiving an indication of a first dialed phone number by a video relay kiosk in a corrections facility, the first dialed phone number representing a destination for a first phone call; querying a remote database to determine a first call destination type associated with the first dialed phone number; recording the first call destination type returned from the query; and recording a first charge for the first phone call, the first charge being based upon a first rate associated with the first call destination type returned from the query.

In another embodiment, the method comprises receiving an indication of a first dialed phone number by a video relay kiosk in a corrections facility, the first dialed phone number representing a destination for a first phone call; querying a local database to determine a first call destination type associated with the first dialed phone number; recording the first call destination type returned from the query; and recording a first charge for the first phone call, the first charge being based upon a first rate associated with the first call destination type returned from the query.

In another embodiment, the method comprises receiving an indication of a first dialed phone number by a video relay kiosk in a corrections facility, the first dialed phone number representing a destination for a first phone call; querying a third-party service provider to determine a first call destination type associated with the first dialed phone number; recording the first call destination type returned from the query; and recording a first charge for the first phone call, the first charge being based upon a first rate associated with the first call destination type returned from the query.

The foregoing has outlined rather broadly the features and technical advantages of the present invention in order that the detailed description of the invention that follows may be better understood. Additional features and advantages of the invention will be described hereinafter. It should be appreciated by those skilled in the art that the conception and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more thorough understanding of the present invention, and advantages thereof, reference is now made to the following descriptions taken in conjunction with the accompanying drawings, in which.

DETAILED DESCRIPTION

Figure 1:
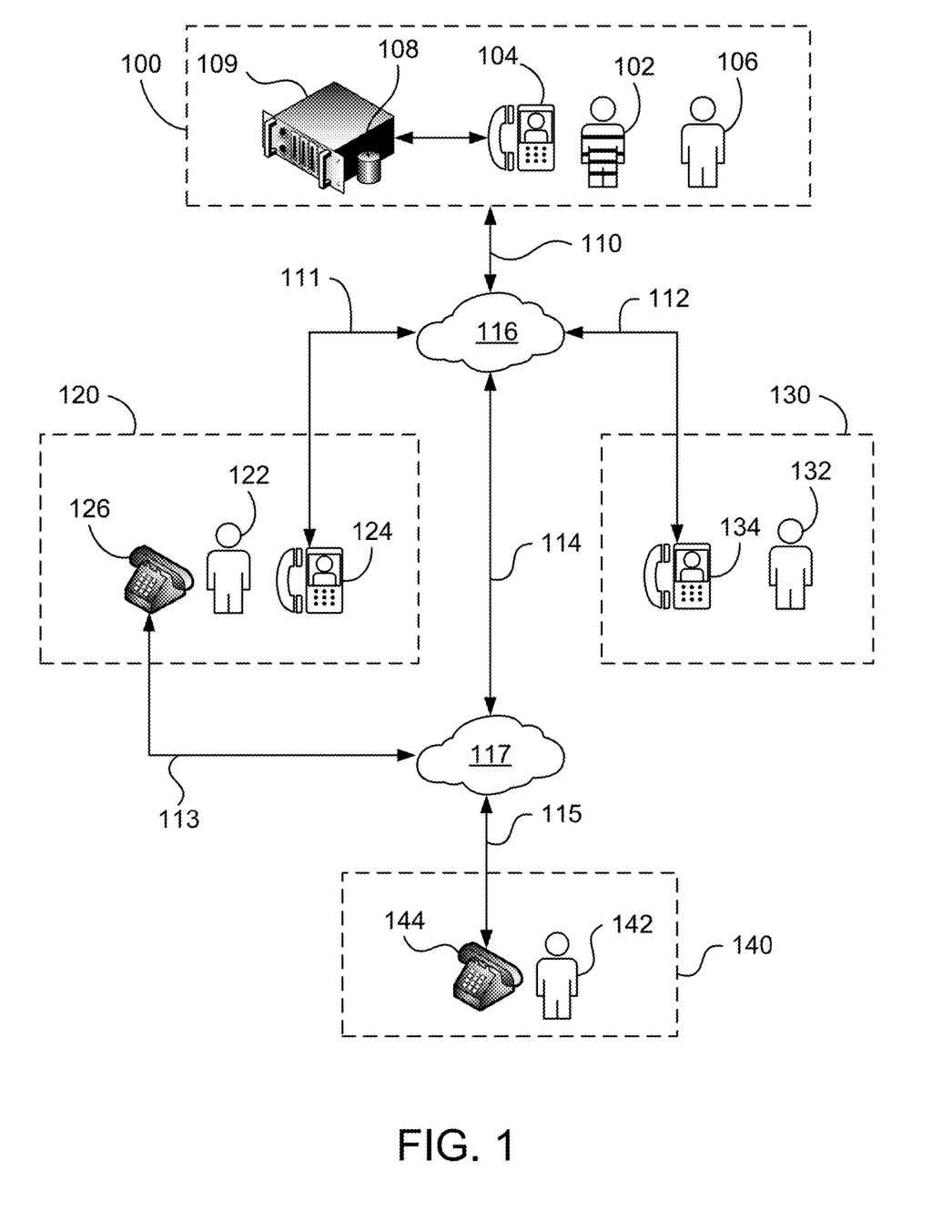
FIG. 1 shows a diagram of a system for determining a call destination type in a device adapted for providing video relay service in accordance with a first embodiment of the present invention.

Embodiments of the present invention are directed to a method and system for rating multiple call destination types from a single video relay kiosk in a corrections facility. FIG. 1 shows a diagram of a system for determining a call destination type in a device adapted for providing video relay service in accordance with a first embodiment of the present invention. Corrections facility 100 is a facility where inmates are incarcerated or otherwise required to reside, such as a jail, prison, penitentiary, juvenile detention center, and the like. Corrections facility 100 can include inmate 102, videophone 104, local database 108, and call manager 109. Inmate 102 is incarcerated or otherwise required to reside at corrections facility 100.

Figure 8:
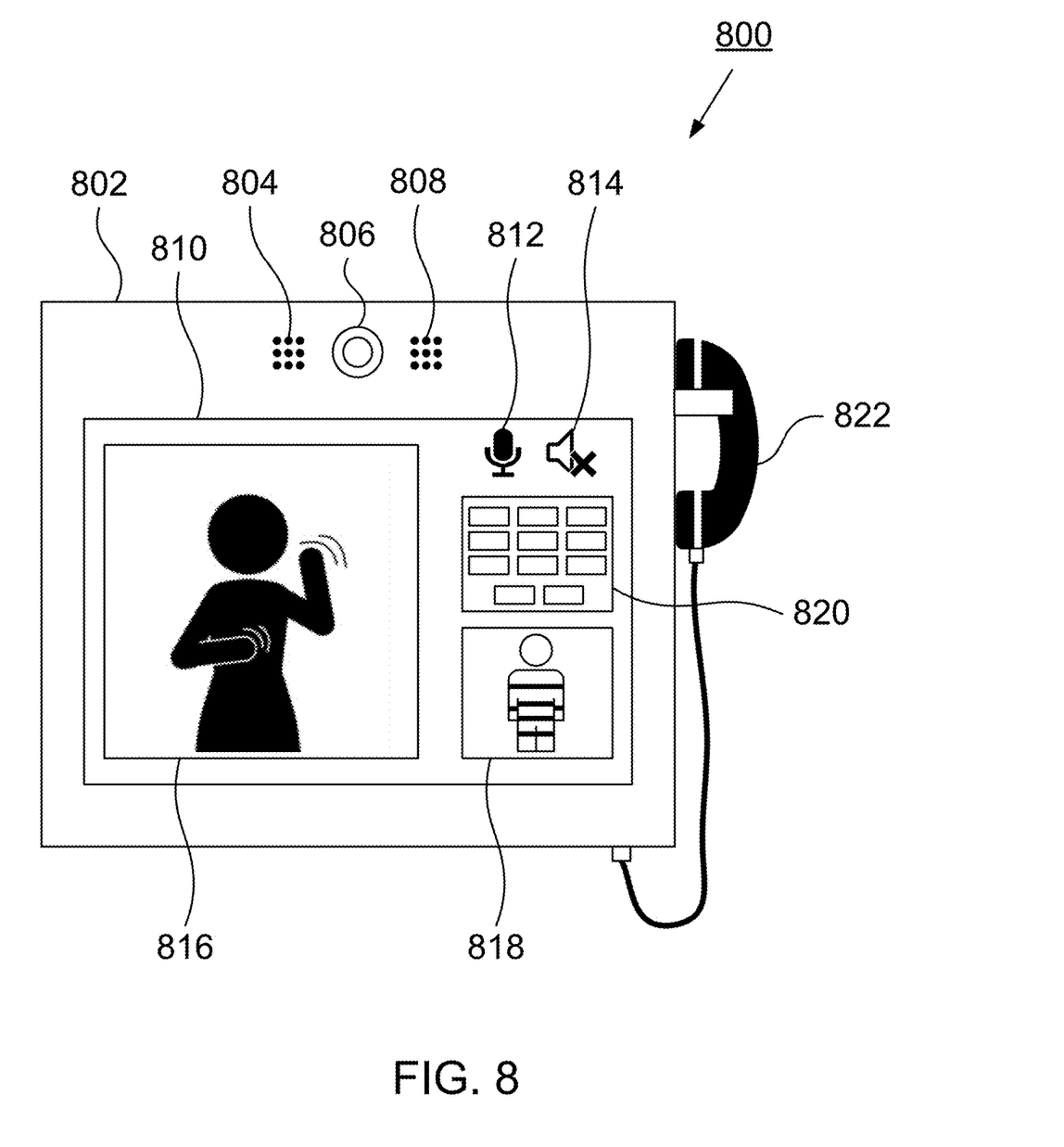
FIG. 8 shows an exemplary external diagram of a system for determining a call destination type in a device adapted for providing video relay service in accordance with embodiments of the present invention.

Video relay kiosk 104 can be any device that is capable of sending and receiving video signals with sufficient fidelity suitable for video telephony. For example, video relay kiosk 104 can comprise discrete components such as a display, video camera, and transceiver coupled together in an application-specific solution. Video relay kiosk 104 can also comprise a network-connected computer, smartphone, or tablet executing a software application that enables video telephony. In a preferred embodiment, video relay kiosk 104 comprises secured video relay kiosk 800 as shown in FIG. 8. Secured video relay kiosk 800 is a video-enabled communications device adapted to provide secure video telephony services in a corrections facility, such as the SecureVRS® system from Tidal Wave Telecom. Secured video relay kiosk 800 is described in further detail below with respect to FIG. 8.

Video relay kiosk 104 can be connected to call manager 109. Call manager 109 provides authorization for phone calls made by inmates of corrections facility 100. Inmate 102 can log into video relay kiosk 104 using a user ID and password provided by corrections facility 100. Inmate 102 is only allowed to access phone numbers that are in his personal list of authorized numbers. The list of authorized numbers can be maintained in local database 108. Local database 109 can be hosted by call manager 109. For example, each call can be recorded or not recorded based upon a profile in local database 108 that is associated with the number. Calls to numbers associated with the relatives of inmate 102 can be recorded, but calls to numbers associated with the attorney of inmate 102 are not recorded. VRS call recording is described in U.S. Pat. No. 10,110,731, which is incorporated by reference herein. In a preferred embodiment, call manager 109 comprises the SecureVRS® Call Manager from Tidal Wave Telecom.

Call manager 109 can be a discrete device, as shown in FIG. 1. Call manager 109 can be a computer program securely running on video relay kiosk 104 itself. Call manager 109 can be a computer program running remotely on a proxy server managed by a by third-party vendor under contract with corrections facility 100. Call manager 109 can be a cloud service provided a by third-party vendor under contract with corrections facility 100. For example, a discrete call manager 109 can be used for managing deployments in a large corrections facility 100 having multiple video relay kiosks 104. However, a smaller jail may only have one video relay kiosk 104, so a discrete call manager 109 may not be needed. The hardware implementation of call manager is not limited to a discrete device but includes any means of providing the functionality of call manager 109 as described herein. Local database 108, in the context of a remote proxy server or cloud service, can actually reside on a remotely-located device. In this context, local database 108 means a database for which corrections facility 100 is responsible for entering and maintaining the data, as is described in further detail below.

Video relay kiosk 104 and call manager 109 are connected via network link 110 to network 116. Network 116 can be any network suitable for video telephony including, but not limited to, packet-switched networks, such as the Internet, and the public switched telephone network (PSTN). In the exemplary embodiment shown in FIG. 1, network 116 is a TCP/IP network such as the Internet. Video relay kiosk 104 can communicate with other devices connected to network 116 using any means suitable for video telephony including, but not limited to, voice over internet protocol (VOIP), session-initiated protocol (SIP), H.323 standard from the International Telecommunication Union Telecommunication Standardization Sector (ITU-T), and the like.

Through network 116, call manager 109 can connect one or more of video relay kiosks 104 to calls of various destination types. A destination type of a call is based on the dialed number for the destination and the calling service supported at the destination. Video call destination types can include calls requiring a sign language interpreter and calls that do not require a sign language interpreter. Video calls requiring a sign language interpreter can include Video Relay Service (VRS) calls and Video Remote Interpreter (VRI) calls. Video calls that do not require an interpreter can include Video Visitation (VV) calls and Direct Video Calling (DVC) calls. Audio call destination types include Voice Over Internet Protocol (VOIP) and plain old telephone service (POTS) calls (also known as public-switched telephone network (PSTN) calls).

Figure 2:
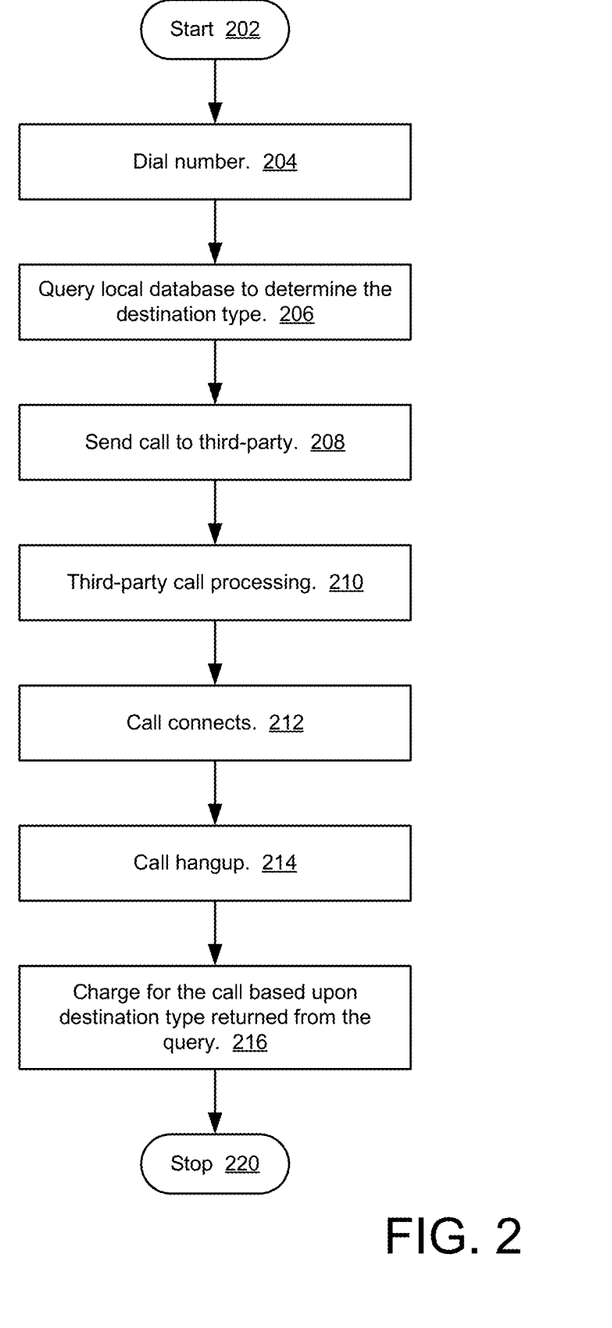
FIG. 2 shows a flowchart of a method for determining a call destination type in a device adapted for providing video relay service in accordance with a first embodiment of the present invention.

FIG. 2 shows a flowchart of a method for determining a call destination type in a device adapted for providing video relay service in accordance with a first embodiment of the present invention. The method starts at step 202. At step 204, inmate 102 dials a phone number using video relay kiosk 104. At step 206, call manager 109 or videophone 104 queries local database 108 to determine the destination type associated with the dialed phone number. Local database 108 is a database of phone numbers and destination types associated with the phone numbers that is maintained at corrections facility 100, typically by employees of corrections facility 100. The destination type returned from the query is recorded in the call detail record for the call. Call detail records can be recorded in call manager 109. At step 208, the call is sent to the third-party destination (e.g., a VRS service provider) for processing and the third party processes the call at 210. The call connects at step 212. The call ends at step 214. At step 216, the call is charged to an account associated with inmate 102 (such as a prison commissary fund or the like) based upon the destination type returned from the query. At step 220, the method ends.

The method described with respect to FIG. 2 enables corrections facility 100 to rate multiple call destination types made from a single video relay kiosk 104. The destination type is determined from a query to local database 108. Corrections facility 100 can then rate the call based on the destination type returned from the query. In this way, corrections facility 100 can rate different types of calls from a single video relay kiosk 104 based on the destinations type determined for each call. That is, from a single video relay kiosk 104, inmate 102 can make calls having different destination types, as described in further detail below, and corrections facility 102 can charge inmate 102 different rates based on the destination type determined for each call.

For example, inmate 102 is a person who is deaf, hard-of-hearing, or speech impaired (D-HOH-SI) and who uses sign language for communicating with other people. Inmate 102 needs to place a telephone call to remotely located party 142. Remotely located party 142 can be, for example, a family member at home or an attorney at the office. The phone call requires a sign language interpreter. Because the phone call requires a sign language interpreter and the phone call is being made to a remotely located party, the destination type for the call should be Video Relay Service (VRS). Video relay kiosk 104 can support VRS calls. Video relay kiosk 104 is used to dial a phone number associated with remotely located party 142. Video relay kiosk 104 instructs call manager 109 to query local database 108 to determine the destination type associated with the phone number entered into video relay kiosk 104. The query to local database 108 returns the destination type associated with the dialed phone number indicating, in this example, a VRS call. A VRS call destination type is recorded in the call detail record for the call.

Video relay kiosk 104 connects to third-party service provider 120 via network link 111. Third-party service provider 120 in this example provides VRS service. Third-party service provider 120 includes sign language interpreter 122, videophone 124, and telephone 126. Typical VRS providers operate large call centers having multiple sign language interpreters. Third-party service provider 120 processes the call by placing a telephone call via public switched telephone network 117 to remotely located party 142 using telephones 126 and 144. After third-party service provider 120 finishes processing the call, the call connects. Sign language interpreter 122 uses videophone 124 to sign to inmate 102. Sign language interpreter 122 uses telephone 126 to talk to remotely located party 142. In this way, sign language interpreter 122 relays the call between inmate 102 and remotely located party 142. When the call ends, inmate 102 is charged for the call based on destination type recorded in the call detail record and the rate corrections facility 100 charges for calls associated with the recorded destination type.

In another example, inmate 102 needs to communicate with closely-located party 106 who is located at corrections facility 100, such as a health care provider at the infirmary. However, inmate 102 and closely located party 106 are unable to communicate in a shared language. This can be due to inmate 102 and closely located party 106 speaking different spoken language natively. This can be due to one of the parties being D-HOH-SI and the other party being unable to communicate in sign language. An interpreter is required interpret the conversation between inmate 102 and closely-located party 106. Because the conversation requires an interpreter, but the conversation is with a closely located party, VRS is not available (VRS requires a remotely-located party). VRS is also limited to sign language interpreting for D-HOH-SI callers and is not available for interpreting different spoken languages. Therefore, Video Remote Interpretation (VRI) is appropriate.

In addition to supporting VRS calls, video relay kiosk 104 can support VRI calls. Video relay kiosk 104 is used to dial a phone number associated with third-party service provider 120. Third-party service provider 120 in this example has contracted with corrections facility 100 to provide VRI service to its inmates. Video relay kiosk 104 instructs call manager 109 to query local database 108 to determine the destination type associated with the phone number entered into video relay kiosk 104. The query to local database 108 returns the destination type associated with the dialed phone number indicating, in this example, a VRI call. A VRI call destination type is recorded in the call detail record for the call.

Video relay kiosk 104 connects to third-party service provider 120 via network link 111. Third-party service provider 120 provides VRI service. Third-party service provider 120 includes interpreter 122 and videophone 124. Third-party service provider 120 can also include telephone 126. Typical VRI providers operate large call centers having multiple interpreters such that many languages, including American Sign Language, can be interpreted. Third-party service provider 120 can process the call by placing a telephone call via public switched telephone network 117 to closely located party 106. Alternatively, third-party service provider 120 can process the call by using the audio capabilities of video relay kiosk 104 because both inmate 102 and closely located party 106 are located in the same room as video relay kiosk 104. After third-party service provider 120 finishes processing the call, the call connects. Interpreter 122 uses telephone 126 and/or videophone 124 to interpret the conversation between inmate 102 and closely located party 106. When the call ends, inmate 102 is charged for the call based on destination type recorded in the call detail record and the rate associated with the recorded destination type. The VRI call may be charged at a different rate than the VRS call, so it is important to determine the destination type of the call and record the destination type in the call detail record. The method described above enables call manager 109 to rate the VRS call and the VRI call, placed from the same video relay kiosk 104, at different rates automatically based on the destination type of the call.

In another example, inmate 102 would like to communicate with remotely located party 132. However, inmate 102 and remotely located party 132 are to communicate in a shared language so interpretation is not necessary. This can be due to inmate 102 and remotely located party 132 both being hearing parties who speak the same spoken language. This can be due to inmate 102 and remotely located party 132 both being able to communicate in sign language. An interpreter is not required interpret the conversation between inmate 102 and remotely located party 132. Because the conversation does not require an interpreter, VRS and VRI, are not needed. A direct, person-to-person call can be used. Video Visitation (VV) and Direct Video Calling (DVC) are destination types for direct, person-to-person video calls. Also, traditional audio telephone calls can be supported, for example, by Voice Over Internet Protocol (VOIP), thereby enabling videophone 104 to provide a total communications solution to the corrections facility.

Video relay kiosk 104 can support Video Visitation (VV). VV is typically used for video calls between an inmate and remotely-located family members. For example, inmate 102 uses video relay kiosk 104 to place a video call to remotely located party 132. Remotely located party 132 can be a family member at remote location 130, such as the family's residence. VV enables parties who can communicate without an interpreter to do so by way of video telephony. Parties who can communicate without an interpreter include hearing parties who speak the same language. In this circumstance, VV is used so that the parties can see each other while they talk. Parties who can communicate without an interpreter also include parties who can communicate by sign language. In this circumstance, VV is used so the parties can see each other while they communicate by sign language.

Direct Video Calling (DVC) is typically used for video calls between a D-HOH-SI calling party and an organization that operates a calling center with customer service representatives who can communicate using sign language, such as a business or a government agency. Video relay kiosk 104 can support DVC calls. For example, a D-HOH-SI inmate 102 uses video relay kiosk 104 to place a video call to remotely located party 132. Remotely located party 132 can be a customer service representative at remote location 130 such as a business that inmate 102 has approval to contact. A video relay interpreter is not required because the customer service representative can communicate with the D-HOH-SI calling party directly using sign language.

Voice Over Internet Protocol (VOIP) enables audio telephony between VOIP phones or between a VOIP phone and the Public Switched Telephone Network (PSTN). Video relay kiosk can support VOIP calls. For example, a hearing inmate 102 uses video relay kiosk 104 to place an audio only call to remotely located party 142 via telephone 144. An interpreter is not required because this is an audio-only call between two hearing parties. Audio-only calls require fewer resources than video calls (e.g., less network bandwidth) and can be charged at a lower rate. Hearing inmate 102 may choose an audio-only over other services like Video Visitation to save money.

Video Visitation, Direct Video Calling, VOIP, Video Relay Service, and Video Remote Interpreting are examples of call destination types that can be supported by video relay kiosk 104. Any call destination type that is capable of being supported by video relay kiosk 104 is within the scope of embodiments of the present invention. The method shown in FIG. 2 enables the determination of call destination types based on queries of a local database maintained by the corrections facility and charging for the calls based on the destination type returned from the query. Calls from various call destination types supported by video relay kiosk 104 can be billed at different rates from a single video relay kiosk 104. The method described above enables call manager 109 to rate multiple call types (e.g., VRS calls, VRI calls, VV calls, DVC calls, VOIP calls, etc.), placed from a single video relay kiosk 104, at different rates automatically based on the destination type of the calls.

For example, VRS service is provided at no cost to subscribers. The VRS provider is compensated for the usage through the TRS fund so that the VRS subscriber is not charged for VRS service. With residential VRS subscribers, it is common for the VRS provider to provide VRS equipment to the VRS subscriber.

VRS service in a corrections facility (such as a prison, penitentiary, juvenile detention center, and the like) differs from residential VRS service in a number of ways that present unique challenges to the corrections facility. Residential VRS equipment is typically a single-user device such as a smartphone, personal computer, or tablet computer running a software application associated with the VRS provider. Such devices are relatively inexpensive (often provided at no cost to the VRS subscriber), have low security requirements, do not need any ruggedization, etc.

In contrast, VRS equipment in a corrections facility requires an application-specific, ruggedized, multi-user device having high security requirements. Installing VRS equipment in a corrections facility can costs hundreds of thousands of dollars. Operation of VRS equipment also requires high bandwidth network connections sufficient to provide the fidelity needed for video sign language interpretation for a bank of multiple devices in various locations throughout the corrections facility. The VRS equipment has to be maintained and repaired when needed. The installation and maintenance of VRS equipment can be a significant capital investment and ongoing expense to a corrections facility offering VRS service to its inmates.

VRS providers cannot charge VRS subscribers for VRS calls. However, where corrections facility 100 is the subscriber to the VRS service, not inmate 102, corrections facility 100 may be able to charge inmate 102 for use of VRS services in corrections facility 100. Charging inmates for use of VRS services in the corrections facility enables corrections facility 100 to recover at least some of the cost of installing and maintaining VRS equipment. Charging inmates for use of VRS services would also reduce or eliminate the perceived inequity where hearing inmates, who are charged for calls in the corrections facility, are aware that D-HOH-SI inmates can make calls for free, which can cause resentment, conflict, fraud, abuse, and vandalism.

Querying a local database maintained by the corrections facility to determine call destination types has some potential drawbacks. Because the local database is maintained by the corrections facility, the data must be updated manually. As a result, the manually updated data can become stale and out-of-date, such that the call destination type of a phone number in local database 108 does not correctly match the present state of the destination type for the phone number. A complicating factor is that inmates can exploit the fact that the local database must be manually updated by having a phone number entered as one destination type into the database by an employee of the corrections facility and then later surreptitiously instructing a person outside of the corrections facility to port the phone number to a different destination type. Typically, the first destination type is billed at a lower rate than the second destination type. Because the corrections facility is not informed of the change in destination type, the inmate is charged at the lower first rate instead of the higher second rate.

Figure 3:
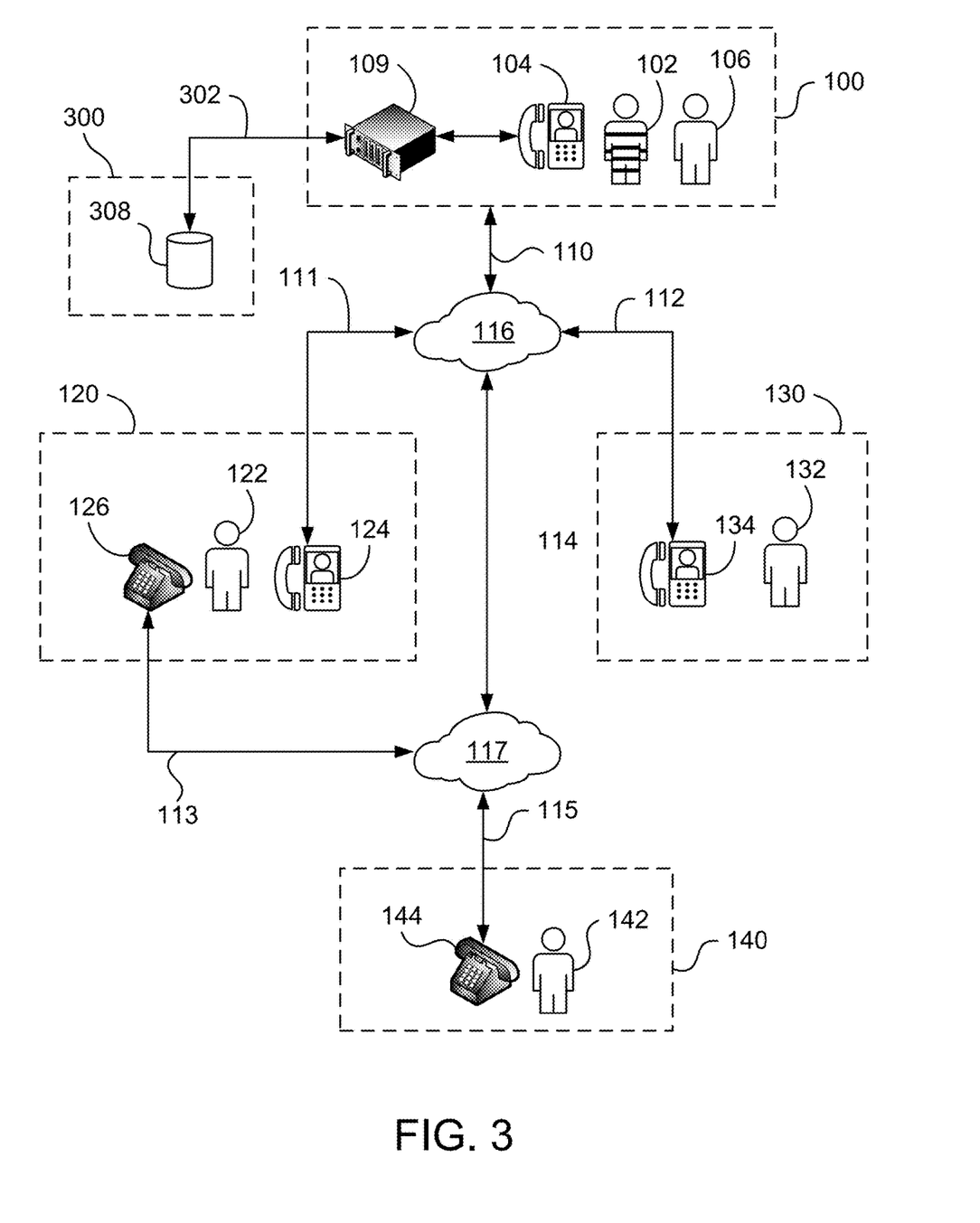
FIG. 3 shows a diagram of a system for determining a call destination type in a device adapted for providing video relay service in accordance with a second embodiment of the present invention.

FIG. 3 shows a diagram of a system for determining a call destination type in a device adapted for providing video relay service in accordance with a second embodiment of the present invention. The second embodiment of the present invention enables more accurate, up-to-date determinations of destination call types by querying an external, remote database that is dynamically updated when a phone number is ported to a different service that results in a different destination type. As shown in FIG. 3, remote database operator 300 includes remote destination type database 308. Remote destination type database 308 can be queried by call manager 109 to determine a call destination type for a call.

In a preferred embodiment, remote database operator 300 can be Neustar, Inc., and remote destination type database 308 can be the iTRS ENUM Database. Neustar operates the iTRS ENUM Database under contract to the FCC. The iTRS database maps 10-digit U.S. telephone numbers to IP addresses or Instant Message screen names using the industry standard E.164 Number to URI Mapping (ENUM) protocol. Video Relay Service and IP Relay users who are D-HOH-SI are assigned these 10-digit telephone numbers by their chosen default provider. These telephone numbers, which automatically create relay calls when they are called by hearing users, are real, local geographic telephone numbers. Relay calls which are direct dialed by hearing callers to deaf or hard of hearing persons use the default relay provider to provide interpreting services. Similarly, a call by a deaf or hard of hearing user to a hearing person may be direct dialed on the D-HOH-SI user's IP device and will be placed automatically as a relay call using the default provider.

Figure 4:
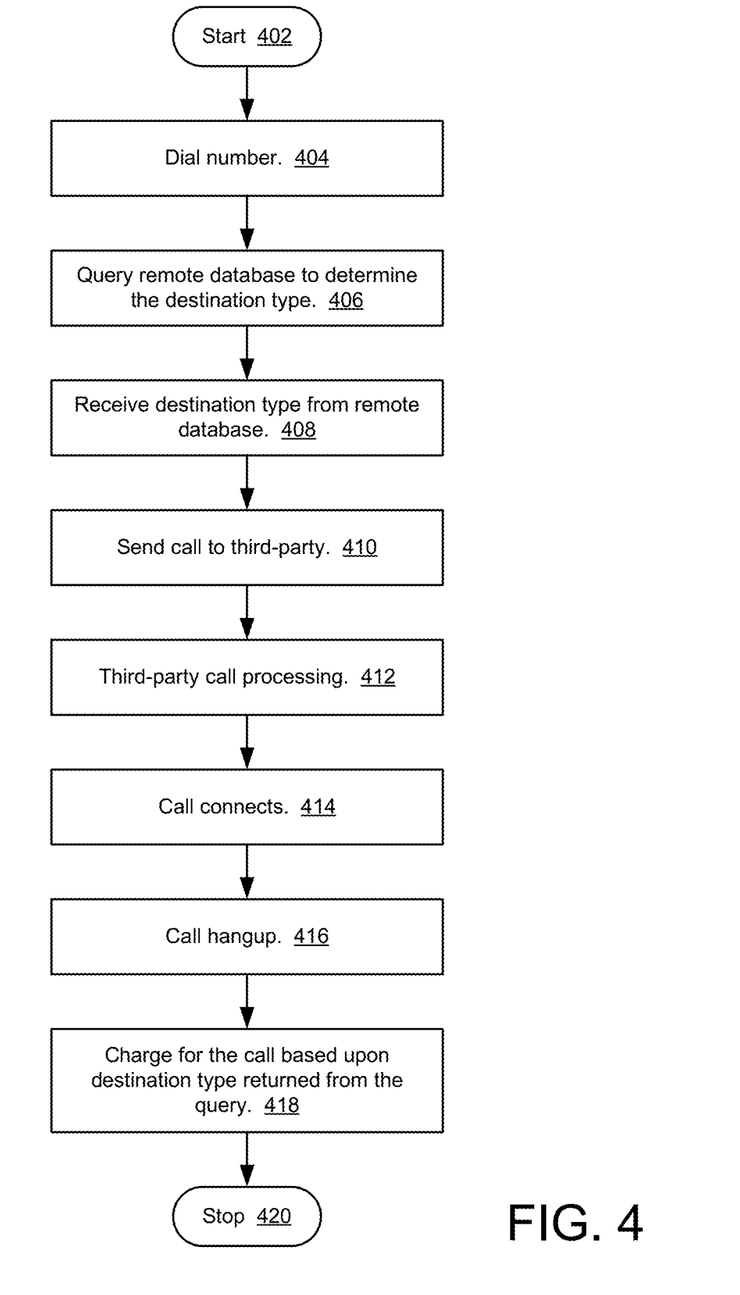
FIG. 4 shows a flowchart of a method for determining a call destination type in a device adapted for providing video relay service in accordance with a second embodiment of the present invention.

FIG. 4 shows a flowchart of a method for determining a call destination type in a device adapted for providing video relay service in accordance with a second embodiment of the present invention. The method starts at step 402. At step 404, inmate 102 dials a phone number using video relay kiosk 104. At step 406, video relay kiosk 104 instructs call manager 109 to query remote destination type database 308 to determine the destination type associated with the dialed phone number. Remote destination type database 308 is a database of phone numbers and destination types associated with the phone numbers that is maintained by remote database operator 300. Remote destination type database 308 is automatically updated with the destination type of a phone number when the phone number is mapped or ported to a new service. The phone number can be automatically mapped or ported using the industry standard ENUM protocol. At step 408, the destination type is received from the query to remote destination type database 308, and the destination type is recorded in the call detail record for the call. At step 410, the call is sent to the third-party destination for processing and the third party processes the call at 412. The call connects at step 414. The call ends at step 416. At step 418, the call is charged to an account associated with inmate 102 (such as a prison commissary fund or the like) based upon the destination type returned from the query. At step 420, the method ends.

The method described with respect to in FIG. 4 enables corrections facility 100 to rate multiple call destination types made from a single video relay kiosk 104. The destination type is determined by a query from video relay kiosk 104 and/or call manager 109 to remote destination type database 308. Corrections facility 100 can then rate the call based on the destination type returned from the query. In this way, corrections facility 100 can rate different types of calls from a single video relay kiosk 104 based on the destinations type determined for each call. That is, from a single video relay kiosk 104, inmate 102 can make calls having different destination types and corrections facility 102 can charge inmate 102 different rates based on the destination type determined for each call.

Querying an external, remote database that is dynamically updated when the destination type of a phone number changes has advantages over querying a local database maintained by the corrections facility to determine call destination types, such as more accurate, up-to-date determinations of destination call types. However, access to the external, remote database may require authorization from remote database operator 300. For example, for call manager 109 to be able to "dip" or query the Neustar iTRS database, corrections facility 100 or the vendor supplying video relay kiosk 104 and call manager 109 to corrections facility must apply for and receive authorization from Neustar. Without this authorization, call manager cannot query the Neustar iTRS database.

Figure 5:
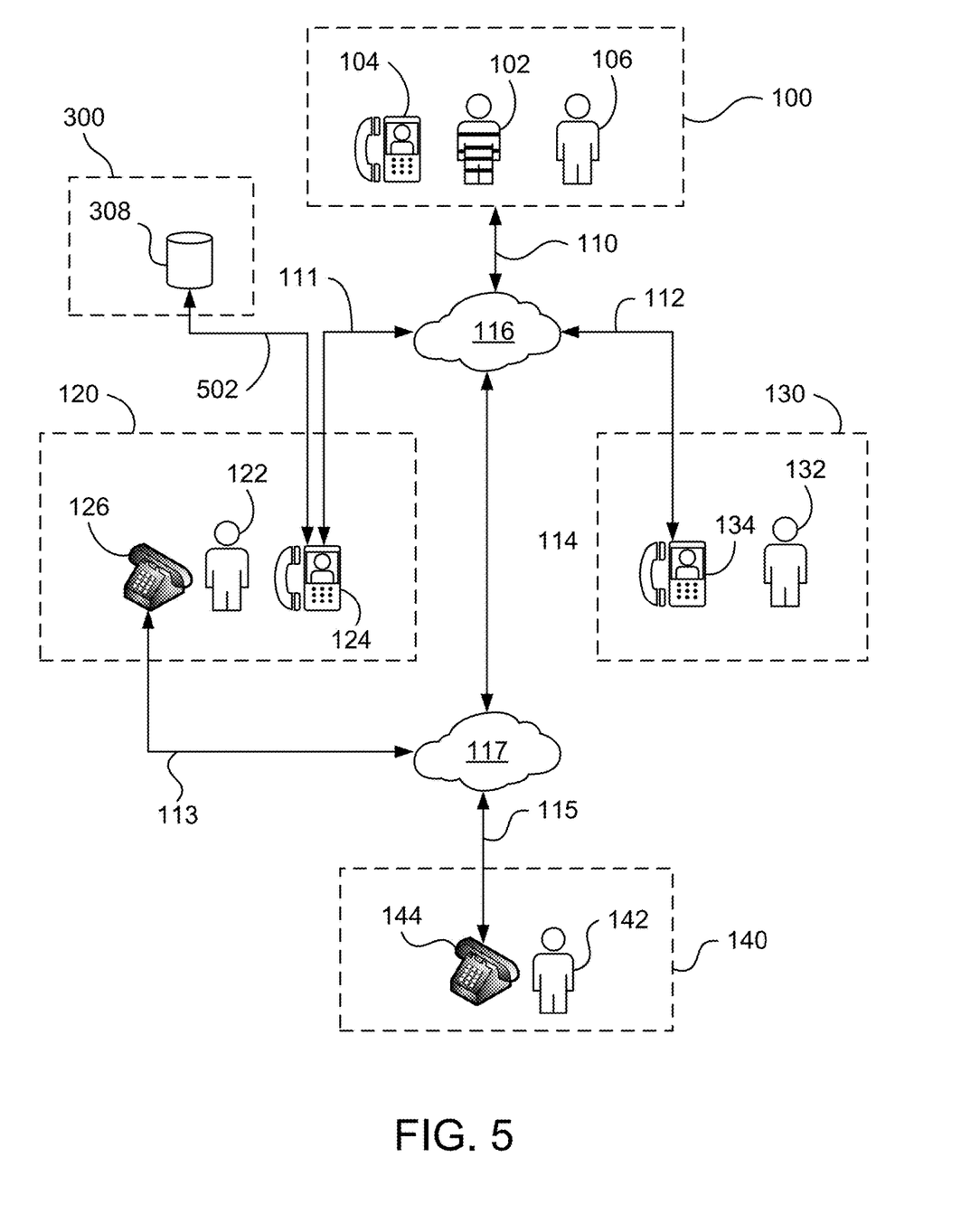
FIG. 5 shows a diagram of a system for determining a call destination type in a device adapted for providing video relay service in accordance with a third embodiment of the present invention.

FIG. 5 shows a diagram of a system for determining a call destination type in a device adapted for providing video relay service in accordance with a third embodiment of the present invention. The third embodiment is suited for the situation where authorization to query remote destination type database 308 has not been granted to corrections facility 100 or the vendor supplying video relay kiosk 104 and call manager 109 to corrections facility 100. As a result, call manager 109 cannot query remote destination type database 308 directly to determine the destination type for the call. However, for example, third party service provider 120 may have authorization to query remote destination type database 308. Videophone 104 and/or call manager 109, when submitting the call to videophone 124 of third-party service provider 120 for processing, includes a request that videophone 124 of third-party service provider 120 query remote destination type database 308 and return the destination type for the call.

Figure 6:
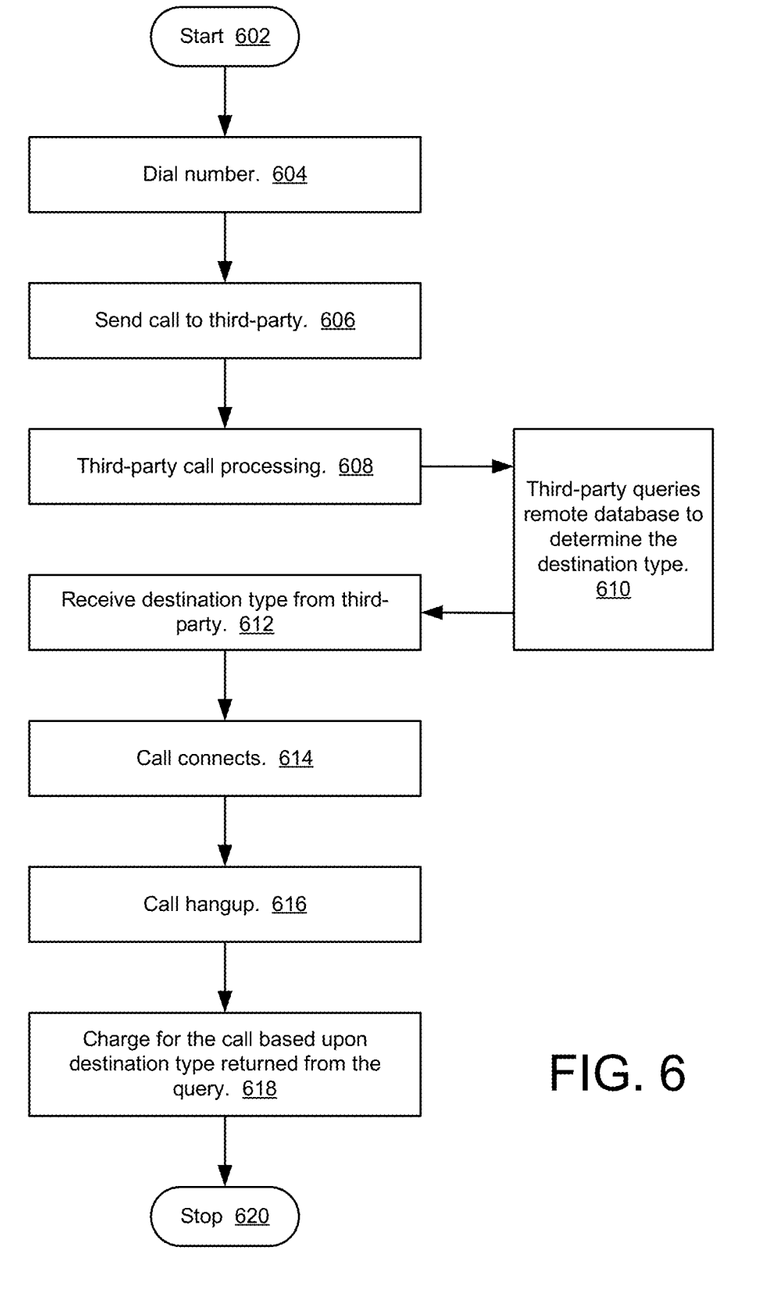
FIG. 6 shows a flowchart of a method for determining a call destination type in a device adapted for providing video relay service in accordance with a third embodiment of the present invention.

FIG. 6 shows a flowchart of a method for determining a call destination type in a device adapted for providing video relay service in accordance with a third embodiment of the present invention. The method starts at step 602. At step 604, inmate 102 dials a phone number using video relay kiosk 104. At step 606, the call is sent to the third-party destination (e.g., a VRS destination) for processing with a request that third party service provider (e.g., the VRS provider) query remote destination type database 308 and return the destination type for the call. Remote destination type database 308 is a database of phone numbers and destination types associated with the phone numbers that is maintained by remote database operator 300, such as the Neustar iTRS database. Remote destination type database is automatically updated with the destination type for a phone number when the phone number is mapped or ported to a new service. The phone number can be automatically mapped or ported using the industry standard ENUM protocol. Third party call processing begins at step 608. At step 610, the third-party service provider queries remote destination type database 308 to determine the destination type associated with the dialed phone number. For example, the request from video relay service kiosk 104 (and/or call manager 109) can cause videophone 124 to automatically query remote destination type database and return the destination type for the call to video relay service kiosk 104 (and/or call manager 109). At step 612, the destination type is received from the query to remote destination type database 308. The destination type is recorded in the call detail record for the call. The call connects at step 614. The call ends at step 616. At step 618, the call is charged to an account associated with inmate 102 (such as a prison commissary fund or the like) based upon the destination type returned from the query. At step 620, the method ends.

The method described with respect to in FIG. 6 enables corrections facility 100 to rate multiple call destination types made from a single video relay kiosk 104. The destination type is determined by a query of remote destination type database 308 by third party service provider in response to a request from video relay service kiosk 104 and/or call manager 109. Corrections facility 100 can then rate the call based on the destination type returned from the query. In this way, corrections facility 100 can rate different types of calls from a single video relay kiosk 104 based on the destinations type determined for each call. That is, from a single video relay kiosk 104, inmate 102 can make calls having different destination types, as described in further detail below, and corrections facility 102 can charge inmate 102 different rates based on the destination type determined for each call.

Figure 9:
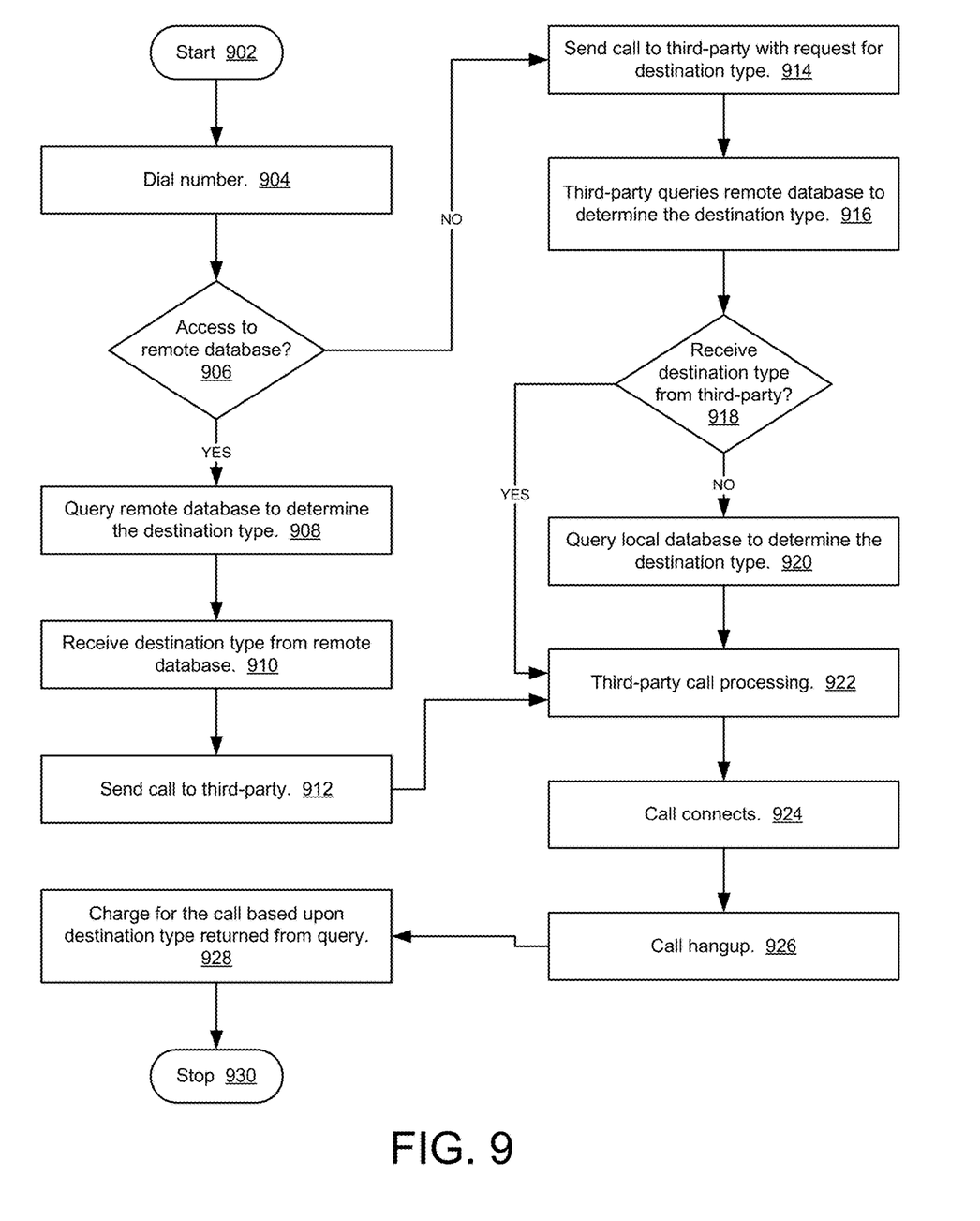
FIG. 9 shows a flowchart of a method for determining a call destination type in a device adapted for providing video relay service in accordance with a fourth embodiment of the present invention.

FIG. 9 shows a flowchart of a method for determining a call destination type in a device adapted for providing video relay service in accordance with a fourth embodiment of the present invention. The method of the fourth embodiment integrates the methods of the first, second, and third embodiments. The method starts at step 902. At step 904, inmate 102 dials a phone number using video relay kiosk 104. At step 906, video relay kiosk 104 instructs call manager 109 to query remote destination type database 308 to determine the destination type associated with the dialed phone number and call manager 109 determines whether it has authorization to query remote destination type database 308.

Remote destination type database 308 is a database of phone numbers and destination types associated with the phone numbers that is maintained by remote database operator 300. Remote destination type database 308 is automatically updated with the destination type of a phone number when the phone number is mapped or ported to a new service. The phone number can be automatically mapped or ported using the industry standard ENUM protocol. However, access to the external, remote database may require authorization from remote database operator 300. For example, for call manager 109 to be able to "dip" or query the Neustar iTRS database, corrections facility 100 or the vendor supplying video relay kiosk 104 and call manager 109 to corrections facility must apply for and receive authorization from Neustar. Without this authorization, call manager cannot query the Neustar iTRS database.

In response to determining that call manager 109 has authorization to query remote destination type database 308, the method proceeds to step 908 where call manager 109 queries remote destination type database 308 directly. At step 910, the destination type is received from the query to remote destination type database 308, and the destination type is recorded in the call detail record for the call. At step 912, the call is sent to the third-party destination for processing and the third party processes the call at 922. The call connects at step 924. The call ends at step 926. At step 928, the call is charged to an account associated with inmate 102 (such as a prison commissary fund or the like) based upon the destination type returned from the query. At step 930, the method ends.

In response to determining that call manager 109 does not have authorization to query remote destination type database 308, the method proceeds to step 914 where call manager 109 sends a request to the third-party service provider to query remote destination type database 308 and return the destination type. At step 910, the third-party service provider queries remote destination type database 308 to determine the destination type of the dialed phone number. At step 910, call manager 109 determines whether the destination type is received from the query to remote destination type database 308. If the destination type is received from the third-party service provider, the destination type is recorded in the call detail record for the call and the method proceeds to step 922. If the destination type is not received from the third-party service provider, then call manager 109 queries local database 108 to determine the destination type of the call (step 920). The third party processes the call at step 922. The call connects at step 924. The call ends at step 926. At step 928, the call is charged to an account associated with inmate 102 (such as a prison commissary fund or the like) based upon the destination type returned from the query. At step 930, the method ends.

The method described with respect to in FIG. 4 enables corrections facility 100 to rate multiple call destination types made from a single video relay kiosk 104. The destination type is determined by a query from video relay kiosk 104 and/or call manager 109 to remote destination type database 308. If call manager 109 is not able to query remote destination type database 308, then call manager 109 requests that a third-party service provider perform the query of remote destination type database 308 and return the destination type to call manager 109. If call manager 109 does not receive a destination type from the third-party service provider, then call manager 109 queries local database 108 to determine the destination type for the call. Corrections facility 100 can then rate the call based on the destination type returned from the query. In this way, corrections facility 100 can rate different types of calls from a single video relay kiosk 104 based on the destination type determined for each call. That is, from a single video relay kiosk 104, inmate 102 can make calls having different destination types and corrections facility 102 can charge inmate 102 different rates based on the destination type determined for each call.

Figure 7:
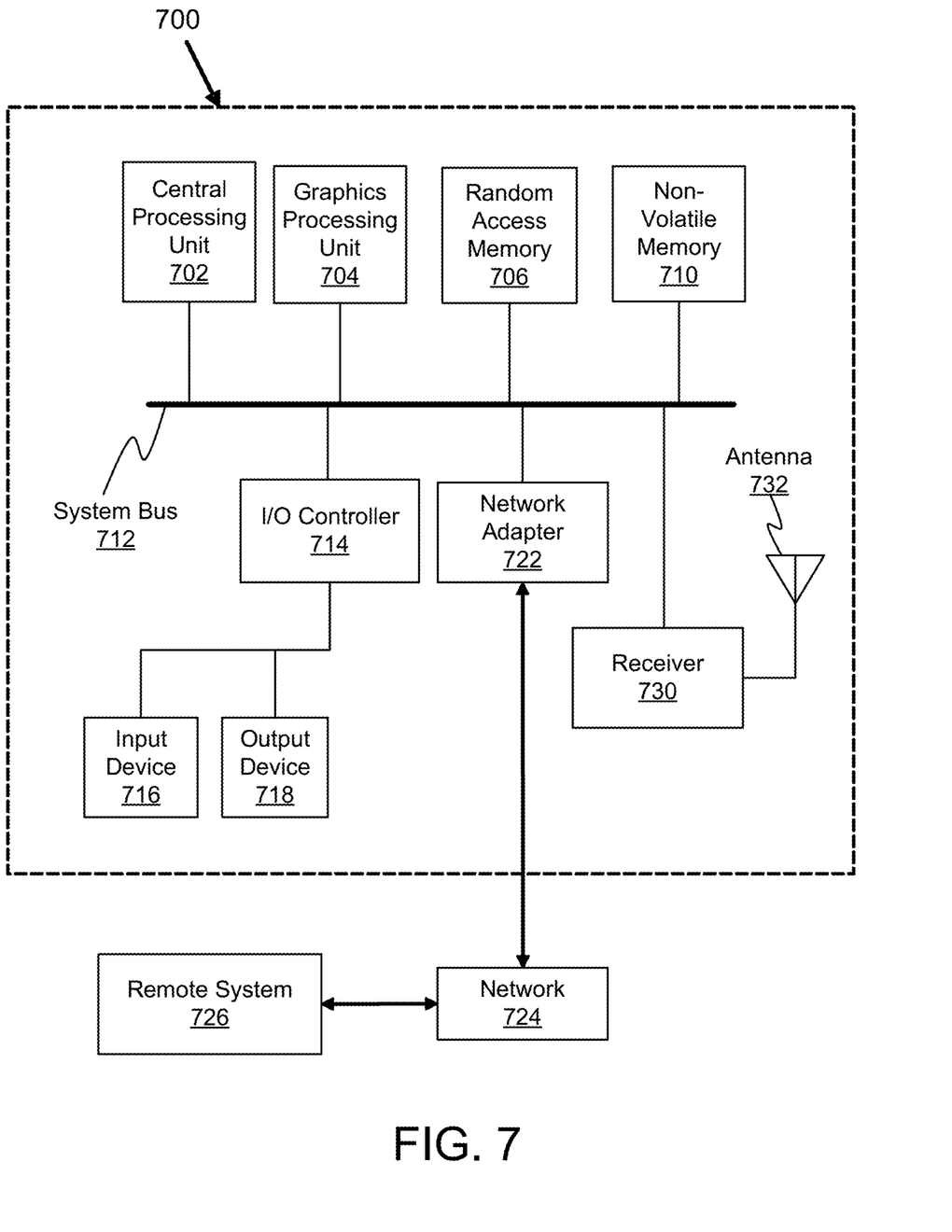
FIG. 7 shows an exemplary internal diagram of a system for determining a call destination type in a device adapted for providing video relay service in accordance with embodiments of the present invention.

FIG. 7 shows a block diagram of an exemplary system 700 suitable for use as a system implementing one or more of the methods described above. System 700 can comprise video relay service kiosk 104. System 700 can comprise call manager 109. System 700 can comprise both video relay kiosk 104 and call manager 109 embodied in a single device. System 700 includes a central processing unit 702 having at least one microprocessor. Central processing unit 702 can be coupled directly or indirectly to memory elements through system bus 712. The memory elements comprise computer-readable memory capable of storing computer-executable instructions. The memory elements can include random access memory 706 employed during the actual execution of program code and non-volatile memory 710 for longer term storage of data and instructions. One or more input devices 716 and output devices 718 can be coupled to system bus 712 either directly or through an intervening I/O controller 714. Examples of input device 716 include, but are not limited to, a pointing device, such as a mouse or a trackpad, or a keyboard. Examples of input device 716 can also include camera and a microphone for recording and transmitting video signals and audio signals. Examples of output device 718 include, but are not limited to, a display screen or a printer. Input device 716 and output device 718 can be combined into a single device comprising a touchscreen comprising a display screen (for displaying information to the user of system 700) having a touch-sensitive surface (for receiving input from the user). System 700 also includes network adapter 722 to enable the system to become coupled to remote system 726 through intervening private or public networks 724. Modems, cable modems, Ethernet cards, and wireless network adapters are just a few of the currently available types of network adapters. System 700 can include one or more receivers 730. Receiver 730 receives wireless signals via antenna 732. Receiver 730 is adapted for receiving a data signal from a transmitting device. Receiver 730 can comprise a transceiver capable of both transmitting and receiving wireless data signals. While various component devices of computer system 700 are shown as separate devices in FIG. 7 for purposes of description, various component devices may be integrated into a single device as is known in the art, such as in a system-on-a-chip (SoC) device.

Some embodiments of the present invention can comprise a computer program encoded in a computer-readable memory of system 700. The computer program comprises computer-executable instructions that, when executed, causes the interactive sign language response system to perform the steps of method described herein. System 700 can be embodied in any suitable data processing system or computer system including, but not limited to, personal computers (PC), file servers, cloud computing systems, software-as-a-service (SaaS) systems, cellular telephones, smartphones, tablet devices, laptop computers, personal digital assistants, and the like.

In a preferred embodiment, video relay kiosk 104 comprises secured video communications device 800 as shown in FIG. 8. Secured video communications device 800 is a video-enabled communications device adapted to provide secure video telephony services in a corrections facility, such as the SecureVRS® system from Tidal Wave Telecom. Secured video communications device 800 is a multi-user device ruggedized for deployment in a corrections facility where high volume usage and the potential for vandalism are concerns. Secured video communications device 800 includes exterior covering 802 and telephone receiver 822. Exterior covering 802 and telephone receiver 822 are ruggedized and tamper-proof to withstand high volume usage and potential vandalism attempts in a manner similar to public telephones and suitable for a corrections facility.

Secured video communications device 800 preferably includes microphone 804, video camera 806, speaker 808, and touchscreen 816. Microphone 804 and speaker 808 enable handsfree audio communications for instances where a user prefers not to use telephone receiver 822. Video camera 806 is adapted to capture a streaming video signal of the user. The streaming video signal is of sufficient resolution and fidelity to enable the user to communicate with a remotely connected party by way of sign language.

Secured video communications device 800 preferably includes touchscreen 810. Touchscreen 810 is ruggedized for high volume use and for potential vandalism attempts. Touchscreen 810 is adapted to display graphical user interface elements to the user and to receive inputs from the user by detecting touches from the user. The inputs received from the user are converted into computer commands based on the location where the user touches the touchscreen and the graphical user interface that is displayed at the location of the user's touch.

Graphical user interface elements on touchscreen 810 preferably include large window 816, small window 818, dialpad 820, and icons 812 and 814. Large window 816 can be used to display a video image of the remote party on the call with the user. Small window 818 can be used to display a video image of the user. Dialpad 802 can be used to enter telephone numbers to dial and to connect and end calls. Icon 812 can be used to display the status of the microphone and enable and disable the microphone with a touch by the user. Icon 814 can be used to display the status of the speaker and enable and disable the speaker with a touch by the user.

For example, in a Video Relay Service application, large window 816 can display a video signal of sign language interpreter 122 to a D-HOH-SI inmate 102. Small window 818 can display a local video signal of inmate 102, whose sign language communication is being interpreted into speech by sign language interpreter 122 for the benefit of remotely-located party 142. Inmate 102 can use the image in small window 818 to monitor his signing and to ensure that he is properly framed so that sign language interpreter 122 can see what he is signing. In a Video Remote Interpreting application between inmate 102 and closely located party 106, the video stream of sign language interpreter 122 is shown in large window 816. The video stream of inmate 102 is shown in small window 818. Sign language interpreter 122 and closely-located party 106 can communicate by speech via microphone 804 and speaker 808, for example, while closely-located party 106 performs a physical examination of inmate 102 in an examination room. In a Video Visitation application, large window 816 can show remotely-located party 132, and small window 818 can show inmate 102.

Secured video communications device 800 preferably includes a multi-user capability that enables multiple users to share the device by entering identifying information. For example, a user can enter an inmate ID number or swipe or insert an inmate ID badge (or the like) prior to making a call. The identifying information can be used to charge the call to the inmate's commissary account or other account used by the inmate for making calls. The identifying information can also be used determine information such as contact information of called parties, restrictions on numbers that can be dialed, restrictions on whether the call can be recorded, etc.

Video Relay Service (VRS), as used herein, specifically refers to the Video Relay Service regulated in the United States by the Federal Communications Commission (FCC) and through which VRS providers are compensated for their costs from the Interstate Telecommunications Relay Service (TRS) fund.

While exemplary embodiments of the present invention have been described with respect to VRS capable equipment installed and used in a corrections facility, nothing would prevent embodiments of the present invention from being used, practiced, and embodied in any VRS capable equipment, regardless of whether the VRS capable equipment is installed in a corrections facility or elsewhere. Determining a call destination type as described herein with any VRS capable equipment is within the scope of the present disclosure.

Although the present invention and its advantages have been described in detail, it should be understood that various changes, substitutions and alterations may be made herein without departing from the scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

I claim:

1. A method for rating multiple call destination types from a single video relay kiosk in a corrections facility, the method comprising:
    receiving an indication of a first dialed phone number by a video relay kiosk in a corrections facility, the first dialed phone number representing a destination for a first phone call;
    querying a remote database to determine a first call destination type associated with the first dialed phone number;
    recording the first call destination type returned from the query; and
    recording a first charge for the first phone call, the first charge being based upon a first rate associated with the first call destination type returned from the query.

2. The method of claim 1, further comprising:
    receiving an indication of a second dialed phone number by the video relay kiosk in the corrections facility, the second dialed phone number representing a destination for a second phone call;
    querying the remote database to determine a second call destination type associated with the second dialed phone number;
    recording the second call destination type returned from the query; and
    recording a second charge for the second phone call, the second charge being based upon a second rate associated with the second call destination type returned from the query, the second rate being different from the first rate.

3. The method of claim 1, further comprising sending the first phone call to a third-party service provider for third-party processing, the third-party service provider providing at least one of video relay service (VRS), video visitation (VV) service, video remote interpreting (VRI) service, direct video calling (DVC) service, or voice over internet protocol (VOIP) service.

4. The method of claim 3, wherein the third-party service provider provides Video Relay Service regulated by the United States Federal Communications Commission through which the third-party service provider is compensated from the Interstate Telecommunications Relay Service (TRS) fund.

5. The method of claim 1, wherein the remote database is a database in accordance with the E.164 Number to URI Mapping (ENUM) standard.

6. The method of claim 5, wherein the remote database is the ENUM database operated by Neustar under contract to the Federal Communications Commission (FCC).

7. The method of claim 1, wherein the first call destination type and the first charge for the first phone call are recorded in a call detail record (CDR).

8. A video relay kiosk in a corrections facility programmed to perform the method of claim 1.

9. A method for rating multiple call destination types from a single video relay kiosk in a corrections facility, the method comprising:
- receiving an indication of a first dialed phone number by a video relay kiosk in a corrections facility, the first dialed phone number representing a destination for a first phone call;
- querying a local database to determine a first call destination type associated with the first dialed phone number;
- recording the first call destination type returned from the query; and
- recording a first charge for the first phone call, the first charge being based upon a first rate associated with the first call destination type returned from the query.

10. The method of claim 9, further comprising:
- receiving an indication of a second dialed phone number by the video relay kiosk in the corrections facility, the second dialed phone number representing a destination for a second phone call;
- querying the local database to determine a second call destination type associated with the second dialed phone number;
- recording the second call destination type returned from the query; and
- recording a second charge for the second phone call, the second charge being based upon a second rate associated with the second call destination type returned from the query, the second rate being different from the first rate.

11. The method of claim 9, further comprising sending the first phone call to a third-party service provider for third-party processing, the third-party service provider providing at least one of video relay service (VRS), video visitation (VV) service, video remote interpreting (VRI) service, direct video calling (DVC) service, or voice over internet protocol (VOIP) service.

12. The method of claim 11, wherein the third-party service provider provides Video Relay Service regulated by the United States Federal Communications Commission through which the third-party service provider is compensated from the Interstate Telecommunications Relay Service (TRS) fund.

13. The method of claim 9, wherein the local database is a database maintained by the corrections facility.

14. The method of claim 13, wherein the local database is a database in accordance with the E.164 Number to URI Mapping (ENUM) standard.

15. The method of claim 9, wherein the first call destination type and the first charge for the first phone call are recorded in a call detail record (CDR).

16. A video relay kiosk in a corrections facility programmed to perform the method of claim 9.

17. A method for rating multiple call destination types from a single video relay kiosk in a corrections facility, the method comprising:
- receiving an indication of a first dialed phone number by a video relay kiosk in a corrections facility, the first dialed phone number representing a destination for a first phone call;
- sending the first phone call to a third-party service provider for third-party processing, the third-party service provider providing at least one of video relay service (VRS), video visitation (VV) service, video remote interpreting (VRI) service, direct video calling (DVC) service, or voice over internet protocol (VOIP) service;
- querying the third-party service provider to determine a first call destination type associated with the first dialed phone number;
- recording the first call destination type returned from the query; and
- recording a first charge for the first phone call, the first charge being based upon a first rate associated with the first call destination type returned from the query.

18. The method of claim 17, further comprising:
- receiving an indication of a second dialed phone number by the video relay kiosk in the corrections facility, the second dialed phone number representing a destination for a second phone call;
- sending the second phone call to a third-party service provider for third-party processing, the third-party service provider providing at least one of video relay service (VRS), video visitation (VV) service, video remote interpreting (VRI) service, direct video calling (DVC) service, or voice over internet protocol (VOIP) service;
- querying the third-party service provider to determine a second call destination type associated with the second dialed phone number;
- recording the second call destination type returned from the query; and
- recording a second charge for the second phone call, the second charge being based upon a second rate associated with the second call destination type returned from the query, the second rate being different from the first rate.

19. The method of claim 17, wherein querying the third-party service provider to determine a first call destination type associated with the first dialed phone number includes sending a request to the third-party service provider that the third-party service provider query a remote database to determine the first call destination type associated with the first dialed phone number.

20. The method of claim 17, wherein the third-party service provider provides Video Relay Service regulated by the United States Federal Communications Commission through which the third-party service provider is compensated from the Interstate Telecommunications Relay Service (TRS) fund.

21. The method of claim 19, wherein the remote database is a database in accordance with the E.164 Number to URI Mapping (ENUM) standard.

22. The method of claim 21, wherein the remote database is the ENUM database operated by Neustar under contract to the Federal Communications Commission (FCC).

23. The method of claim 17, wherein the first call destination type and the first charge for the first phone call are recorded in a call detail record (CDR).

24. A video relay kiosk in a corrections facility programmed to perform the method of claim 17.

* * * * *